United States Patent [19]
Mann et al.

[11] Patent Number: 4,626,844
[45] Date of Patent: Dec. 2, 1986

[54] ADDRESSABLE ELECTRONIC SWITCH

[75] Inventors: Bruce L. Mann, Flat Rock; Steve A. Batti, Martinsville, both of Ind.

[73] Assignee: Indiana Cash Drawer Company, Shelbyville, Ind.

[21] Appl. No.: 554,917

[22] Filed: Nov. 23, 1983

[51] Int. Cl.$^4$ .......................... G06F 3/04; G08B 13/06
[52] U.S. Cl. .................. 340/825.31; 364/405
[58] Field of Search ............. 340/825.31, 825.05, 340/825.32, 825.08; 364/404, 405; 235/379; 370/86, 89

[56] References Cited

U.S. PATENT DOCUMENTS

| | | | |
|---|---|---|---|
| 3,061,185 | 10/1962 | Richard | 235/22 |
| 3,628,724 | 12/1971 | Showers, Jr. | 235/22 |
| 3,956,615 | 5/1976 | Anderson et al. | 340/825.34 |
| 4,035,792 | 7/1977 | Price et al. | 235/22 |
| 4,070,564 | 1/1978 | Tucker | 364/405 |
| 4,103,289 | 7/1978 | Kolber | 340/825.32 |
| 4,114,027 | 9/1978 | Slater et al. | 235/379 |
| 4,266,271 | 5/1981 | Chamoff et al. | 364/405 |
| 4,321,672 | 3/1982 | Braun et al. | 364/408 |
| 4,470,140 | 9/1984 | Coffey | 370/89 |
| 4,502,120 | 2/1985 | Ohnishi et al. | 364/405 |

*Primary Examiner*—Donald J. Yusko
*Attorney, Agent, or Firm*—Woodard, Weikart, Emhardt & Naughton

[57] ABSTRACT

An addressable electronic switch which switches power to an electromechanical device upon detection of an individual access code in a serial data stream. The addressable switch is capable of series connection with a host computer and other peripheral devices. The switch circuit receives a serial data stream containing access code information for one or more of such switches as well as data to be transmitted to another peripheral device, detects the presence of an individual access code within the data stream and causes a switching action in response thereto, and retransmits all data except its own detected access code.

10 Claims, 7 Drawing Figures

ADDRESSABLE ELECTRONIC SWITCH

BACKGROUND OF THE INVENTION

The present invention relates to electronic switching devices for switching of electromechanical loads, and particularly to addressable electronic switching devices.

Control systems, industrial equipment and computer pripherals commonly utilize electromechanical devices such as solenoids or motors which are selectively energized under control of a central computer or controller. Different actuators receive power from individual power switching circuits conventionally connected to separate output ports of the computer or controller. Electronic cash registers and transaction terminals provide examples of systems having a number of pripherals controlled by a computer. Normally the cash drawers associated with such systems are spring-loaded and are opened by energizing a solenoid to release a latch. A complete cash register or terminal typically includes one or more cash drawers, often located remote from an associated terminal, as well as a number of other peripheral devices such as receipt printers, displays, bar code readers. electronic scales, and in some cases credit card validators and coupon dispensers. Existing systems generally require a separate input/output port for each cash drawer or other peripheral device, which introduces considerable expense in comparison to the cost of a cash drawer or peripheral device.

Peripheral devices are sometimes connected in parallel with one input/output port, commonly employing Y-cable splices. Such splices are not only unduly cumbersome but they place unwanted restrictions on the baud rate and length of data cable due to the necessarily limited drive capability of any host computer terminal. The addressing scheme of the present invention permits connection of multiple switching devices to a single port without adversely affecting data transmission.

Any cash register system further has associated with it considerations of security. Attempts have been made to increase security, from completely mechanical locks to a solenoid-controlled latch mechanism which is supplied with power to actuate the solenoid only after completion of an authorized transaction. Electrical key systems have employed keys with shorting contacts for placement into an electrically conductive keyway to cause the solenoid action necessary to unlock the drawer, as well as special keys having resistors or capacitors of predetermined values which can be detected by a sensing circuit. However, unauthorized access to any of these systems has proven to be possible without much difficulty. In contrast, a cash drawer utilizing the teachings of the present invention opens only when addressed with a specific access code.

SUMMARY OF THE INVENTION

The present invention provides an addressable electronic switch which switches power to an electromechanical device upon detection of an individual access code in a serial data stream. The apparatus of the present invention is capable of receiving a serial data stream containing data to be transmitted to another addressable electronic switch or other peripheral device, detecting the presence of an individual access code within the data stream and causing a switching action in response thereto, and retransmitting the remaining data on a serial data line.

The teachings of the present invention permit connection of any number of cash drawers in series with a single output port of a host computer terminal, and further permit series connection to other peripheral devices.

DESCRIPTON OF THE PREFERRED EMBODIMENT

Figures 1A, 1B:
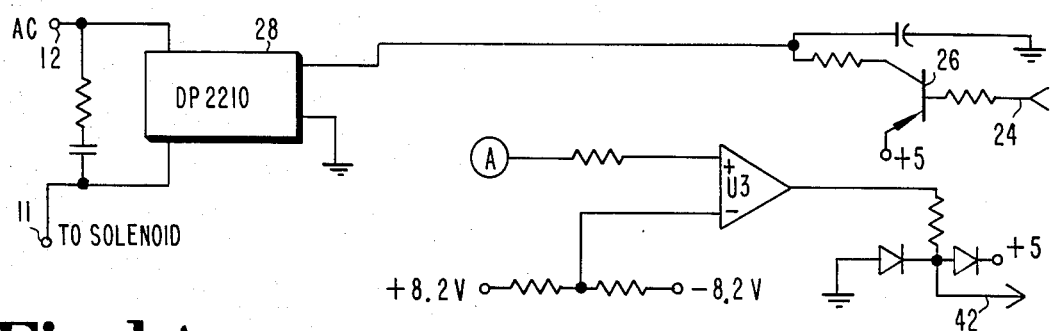
FIG. 1, consisting of parts 1A–1D, constitutes an electrical schematic of an addressable electronic switching device according to the present invention.

For the purposes of promoting an understanding of the principles of the invention, reference will now be made to the embodiment illustrated in the drawings and specific language will be used to describe the same. It will nevertheless be understood that no limitation of the scope of the invention is thereby intended, such alterations and further modifications in the illustrated device, and such further applications of the principles of the invention as illustrated therein being contemplated as would normally occur to one skilled in the art to which the invention relates.

Figures 1C, 3:
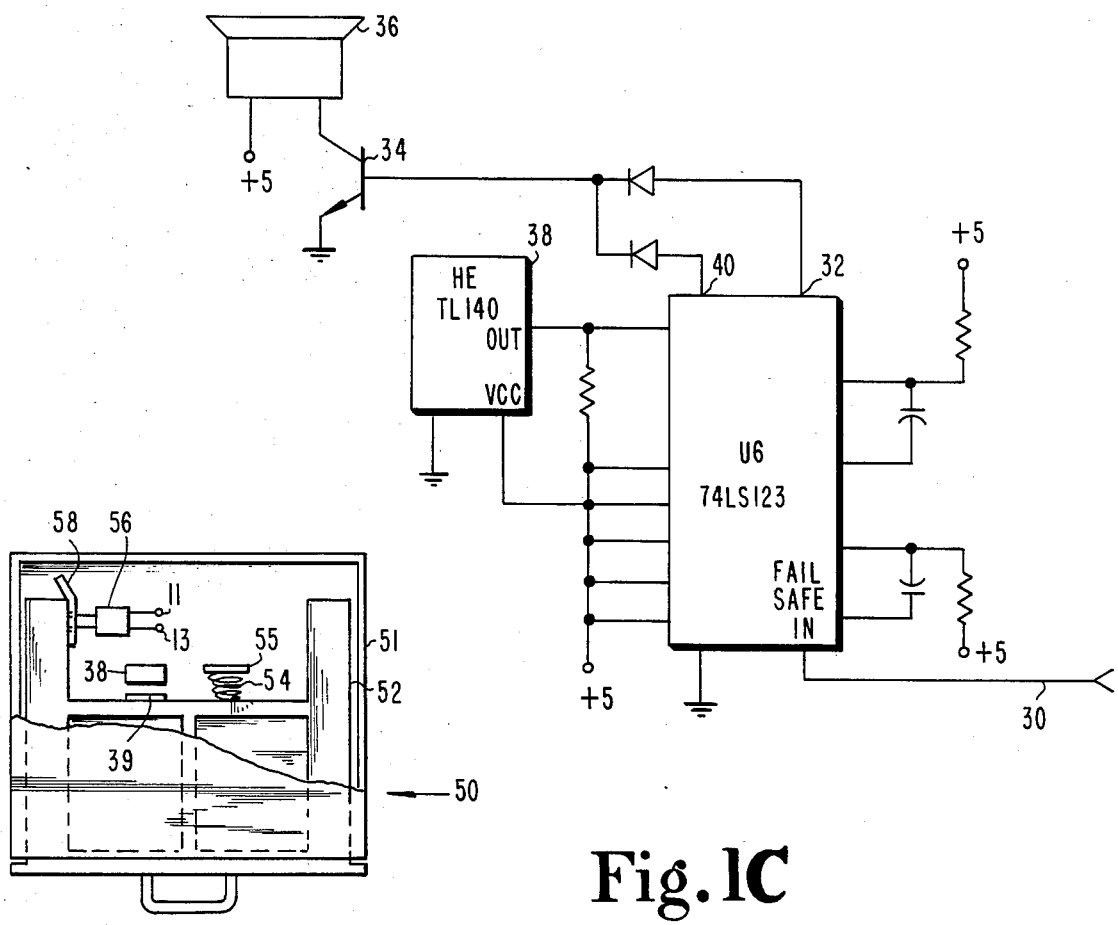
FIG. 3 shows a top view of a cash drawer used in conjunction with one embodiment of the invention.
Figure 1D:
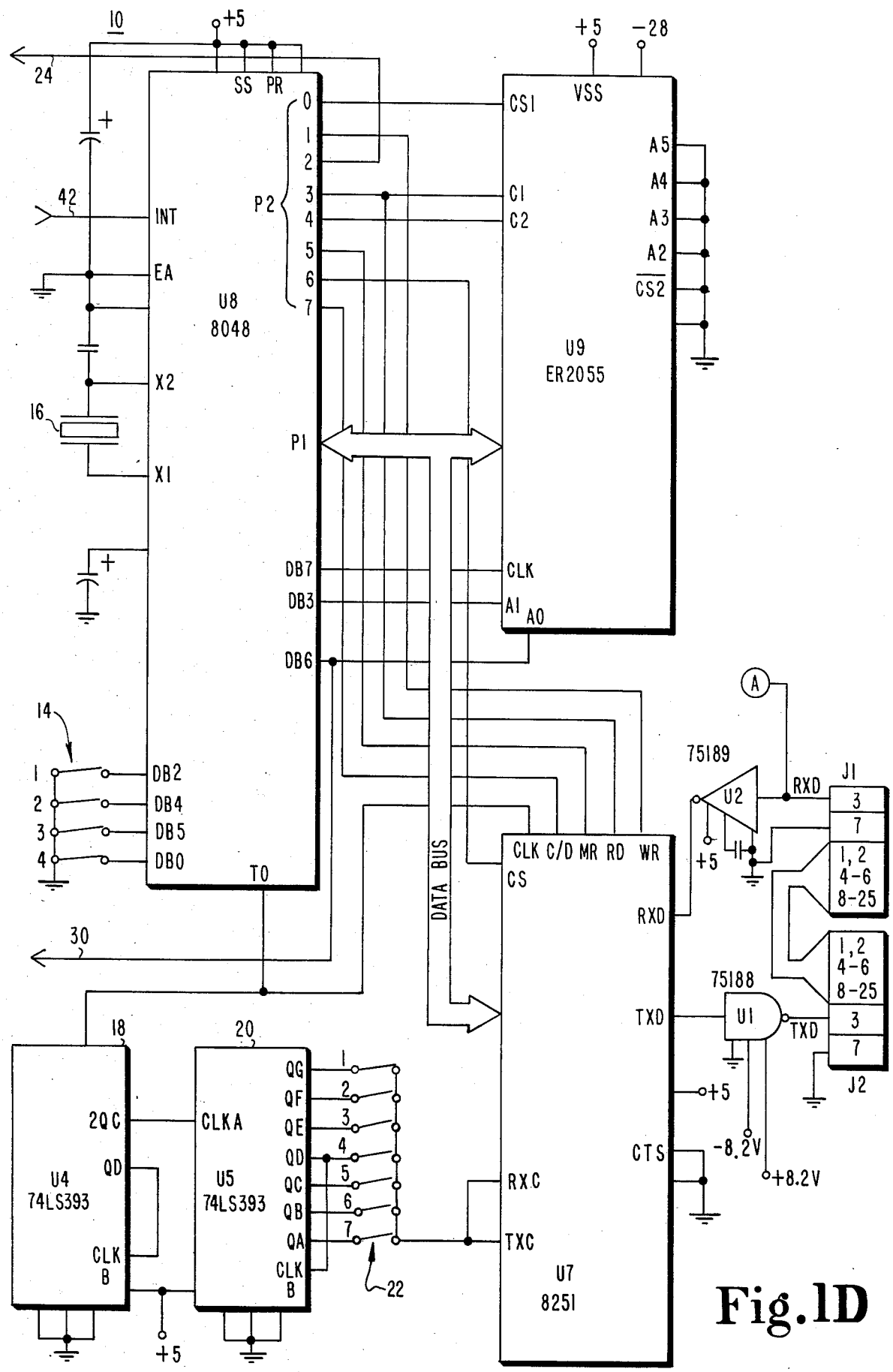

Referring to FIG. 1 in conjunction with FIG. 3, the circuit elements making up the preferred embodiment of the addressable electronic switch according to the present invention are shown in schematic form along with a top view of a cash drawer which, for illustration, will be described as the device controlled by the addressable switch. Microprocessor U8, electrically alterable read-only memory (EAROM) U9 and universal asynchronous receiver-transmitter (UART) U7 form the main processing circuit portions of addressable switch 10. This circuitry is connected to a serial data line through line receiver U2 and serial input/output (I/O) port J1. Similarly, U7 is connected through line driver U1 to I/O port J2 and therefrom to a second serial data line. Except for the RXD line to line receiver U2 and the TXD line to line driver U1, each data line is bidirectional through ports J1 and J2. J1 and J2 are 25-pin connectors of the type conventionally used for data transmission conforming to EIA standard RS232C. Addressable electronic switches of the type illustrated in FIG. 1 may be connected together in a daisy chain connecting I/O port J1 of a receiving device to I/O port J2 of the prior sending device in the chain, the length of the chain being limited only by the number of available addresses which can be stored in memory. Sending devices may include a host computer as well as other addressable switching devices, while receiving devices may include other addressable switching devices and other peripherals. Output switch contracts 11 and 12 connect to an electromechanical device which, as will be described more fully hereinafter, is controlled by the addressable switch.

The power supply for the addressable electronic switch circuitry is of conventional design and needs no further description. It will suffice to say that in the preferred embodiment four DC voltage levels are derived from a conventional AC voltage source: +5 volts DC, +8.2 volts DC, −8.2 volts DC and −28 volts DC.

The operation of the addressable switch may be generally described as follows: An incoming data stream is received from a sending device on pin 3 of I/O port J1 and is coupled through U2 to U7. At selected times, as will be described, microprocessor U8 reads in received data from U7 and, under certain conditions, compares portions of that data to an access code stored in memory U9. If the stored access code matches the data portion with which it is compared, U8 sends out a signal which, as will be described further hereinafter, causes a switching action to take place. In the preferred embodiment, output switch contact 11 is connected to a solenoid mechanically coupled to a latch member to hold a spring-loaded cash drawer closed. The solenoid is actuated in response to the signal from U8, releasing the latch and allowing the cash drawer to open. As the output from microprcessor U8 is a momentary signal, when an operator closes the cash drawer it remains closed until a subsequent signal is generated by U8 upon recognition of another correct access code contained in the data stream. Microprocessor U8 retransmits all received data except a correct access code. U8 retransmits the data to U7 at selected times, as will be described, and therefrom to U1 and then to I/O port J2.

It is important not to retransmit correct access code data because, in most instances, one of the other peripheral devices is a printer or a display which will reveal a portion of the correct access code if such code is transmitted to the peripheral device. Thus, addressable electronic switch 10 inhibits the transmission of such data upon detection of a correct access code. It will be appreciated by those skilled in the art that, if additional addressable electronic switches are connected to I/O port J2 of addressable switch 10, each of those electronic switches may be programmed with its own access code. Each such addressable switch examines any access code data transmitted from the hose computer except access code data which is recognized by a prior addressable switch in the chain.

Addressable electronic switch 10, shown in FIG. 1, may be reprogrammed with a different access code by transmitting from the host computer reprogramming control data along with the new access code. Microprocessor U8 is programmed to recognize the reprogramming control data and, upon such recognition, to enter the new access code into memory U9 in place of the access code currently stored therein. The reprogramming code is not retransmitted by microprocessor U8. Consequently, only the leading drawer in a daisy chain may be reprogrammed.

Figure 2A:
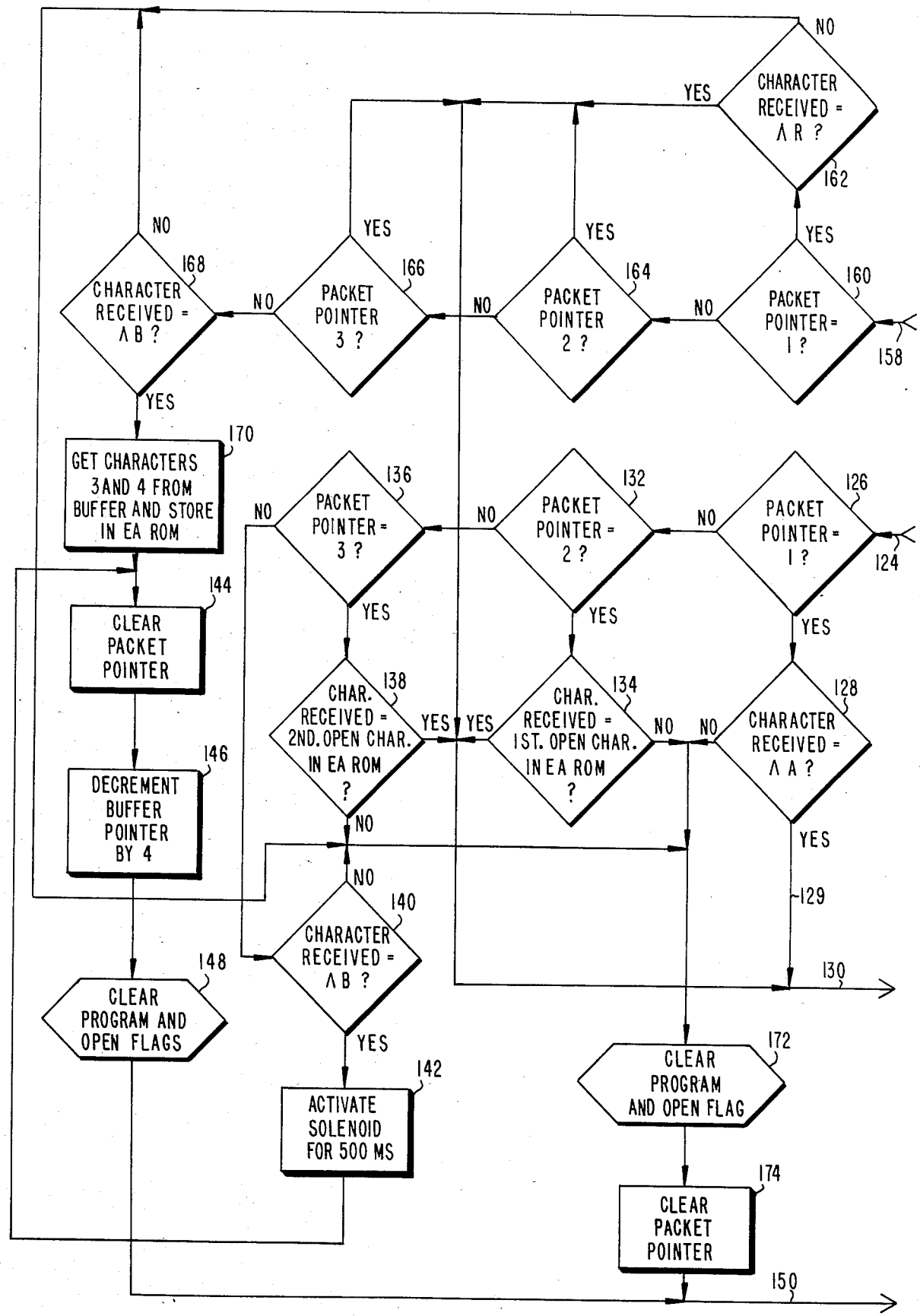
FIGS. 2A and 2B together constitute a flowchart illustrating the program steps executed by the microprocessor shown in FIG. 1.
Figure 2B:
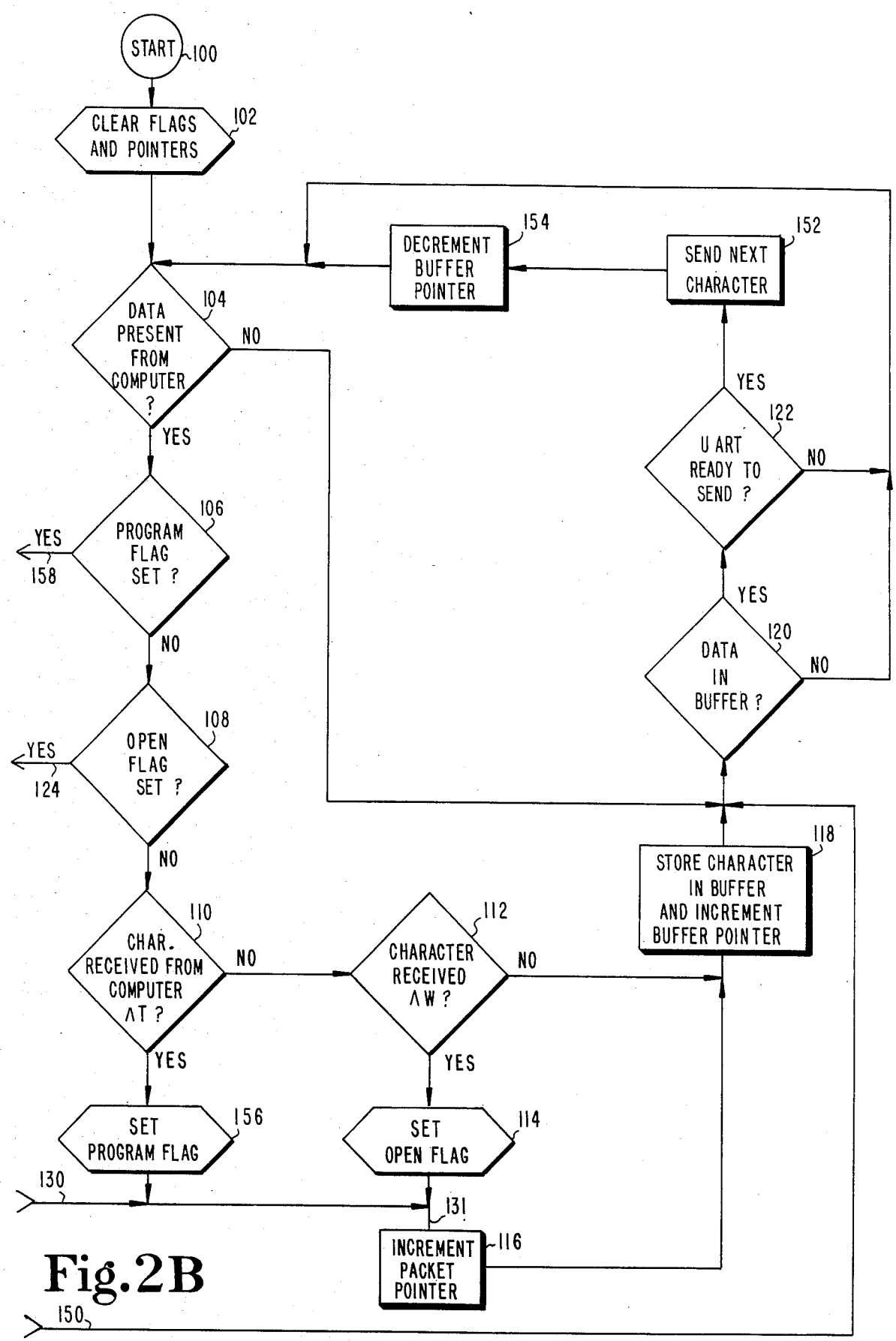

The operation of the addressable electronic switch may be further understood with reference to FIGS. 2A and 2B, which together comprise a flow chart for the program executed by microprocessor U8. The program starts at 100 an initializes by clearing flags and pointers in step 102. The first step after this initialization procedure is step 104 in which the microprocessor checks the status of UART U7 to determined whether there is data present from the host computer. It should be noted that this data may have passed through other addressable switches before arriving at addressable switch 10.

Assuming that the microprocessor finds data present from the computer, program execution proceeds to step 106, a decision step in which the processor determines whether the PROGRAM flag is set. Since all flags and pointers were cleared in step 102, at this stage in the program the PROGRAM flag is not set. Accordingly, program execution proceeds to step 108, another decision block in which the processor determines at this stage that the OPEN flag is clear. The processor next determines, at decision block 110 whether the character received from the computer and supplied by the UART to the microprocessor on the data bus is a Control-T. The characters in the data stream are ASCII characters. For the present, it will be assumed that addresssable switch 10 is already programmed, so that the character is not a Control-T. As a result, the microprocessor proceeds to decision block 112. If the character received is a Control-W, and it will be assumed for the present that it is, the microprocessor sets the OPEN flag at 114 and then increments the packet pointer at step 116.

After incrementing the packet pointer the microprocessor, in step 118, stores the character, the Control-W, in an internal buffer and increments the buffer pointer. The buffer pointer value represents the total number of characters in the buffer, including characters recognized as part of the access code packet for addressable switch 10. In step 120, the processor then determines whether there is data in the buffer which is not part of a valid access code packet. Such data is the only data sent out to other devices in the chain. As will be understood from the following discussion, a character may be initially recognized as valid and later determined not to be part of the access code packet for addressable switch 10. Any such data is considered invalid as of the time the first invalid character is recognized and is therefore identified as data for transmission in step 120. Because only a Control-W is stored in the buffer and that character is thus far considered valid, the microprocessor concludes that there is no data in the buffer to be sent out, and thus proceeds directly to decision block 104 in which the processor again checks for data present from the computer.

Since the microprocessor operates much faster than data can be received, there will not be data present from the computer in the first time this data check is made in step 104 after the storage of a recognized control character. Consequently, program control branches to decision block 120, the processor again checks the buffer as already described, then checks the UART status, which remains not ready to send, and then program control returns to decision block 104. The program remains in this loop until data is detected from the computer. At that time, the status of the PROGRAM flag is again checked at 106. At this point the PROGRAM flag is again not set. However, the OPEN flag is set due to the Control-W being received, consequently, program control proceeds on line 124 to decision block 126 wherein the status of the packet pointer is examined. The packet pointer has a value of 1, having been incremented in step 116, and so the microprocessor examines the character then present on the data bus from the UART to determine if it is a Control-A, in step 128. If the character received is identified as Control-A, program control proceeds along lines 129, 130 and 131 to step 116 in which the packet pointer is again incremented, this time to a value of 2. The Control-A is stored in buffer in step 118, the buffer pointer is again incremented, and the processor proceeds to step 120. As before, the processor remains in the loop consisting of steps 120, 122, and 104 until another character of data is present from the computer.

At that time, program control proceeds through steps 106 and 108 to decision block 126 as before. At this point, the packet pointer has a value of 2, thus instead of proceeding to step 128, the processor identifies the packet pointer value of 2 in decision block 132 and then determines, in block 134, whether the character currently received is equal to the first OPEN character of the individual access code stored in the EAROM. If so, program control proceeds to block 116 as before, the packet pointer is incremented to a value of 3, the new character is stored in buffer and the buffer pointer is incremented again, and the processor then waits for the next character from the computer.

For the next character received, the operation of the processor is identical to that just described until the processor reaches step 132. At that point, a transfer to step 136 occurs wherein the packet pointer value of 3 is identified. Then, in step 138, the currently received character is compared with the second OPEN character in the EAROM. If the characters match, the current character is stored in buffer, the packet and buffer pointers are both incremented again, and the processor proceeds to the wait loop already described. When data is again present from the computer, the processor proceeds through the aforementioned steps 104, 106, 108, 126 and 132 and through decision block 136 to step 140, because the packet pointer value is now equal to 4. At 140 the identity of the received character is again determined. If the character received is a Control-B, the detection of the access code is complete, and the microprocessor responds by activating the solenoid to open the cash drawer, as shown in block 142. The solenoid is activated for one-half second, which is sufficient time for the drawer latch to release. After the drawer is again closed and consequently latched, the drawer will remain latched because the solenoid is no longer activated.

From step 142 program control proceeds to step 144 in which the packet pointer is cleared, then to step 146 in which the buffer pointer is decremented by 4. This reduces the buffer pointer value to zero. After this, the microprocessor clears the PROGRAM and OPEN flags at 148 and then proceeds along line 150 to decision block 120. Since the buffer pointer value is zero, it is concluded in step 120 that there is no data in the buffer. The microprocessor returns to step 104 to accept the next character.

The steps executed during reprogramming mode will now be described. Reprogramming control characters and access code data characters are received from the computer in the same fashion as other characters, and the microprocessor steps are the same except as will now be described. If the character received from the computer is determined, in step 110, to be a Control-T, the microprocessor sets the PROGRAM flag in step 156 before proceeding to increment the packet and buffer pointers and store the Control-T in its buffer. When the next character is received from the computer, the processor responds to the set PROGRAM flag in step 106 by proceeding along line 158 to step 160.

In a matter similar to that described already with respect to the drawer opening mode, the processor identifies the two control characters associated with the programming mode, completing this identification with step 162. When a Control-R is recognized in step 162, program control proceeds along line 130 to step 116 and the subsequent steps which have already been described. The control character is stored, as are the next two characters received from the computer after identification of packet pointer values 2 and 3 in program steps 164 and 166, respectively. When the following character is received, the packet pointer is equal to 4, thus program control reaches step 168 wherein it is determined whether the character currently received is a Control-B. A Control-B is the final character needed to effect a reprogramming operation. When the Control-B is received, the microprocessor retrieves characters 3 and 4 from its internal buffer and stores those characters in the EAROM in place of the previous two access code characters stored there. Once this storage operation is complete, program steps 144, 146 and 148 are again executed as already described for the drawer opening sequence, and then program control proceeds along line 150 to decision step 120.

The function of program steps 172 and 174 will now be explained. If a Control-A is not recognized in step 128, the microprocessor ceases examination of further characters in an anticipated 5-character string as potential access code characters and clears the OPEN flag at 172 and the packet pointer at 174. The microprocessor then executes step 120. This time there is data in the buffer which must be retransmitted, so program control proceeds to step 122. If the UART has an empty holding buffer, it is ready to send data, and microprocessor U8 responds by sending the next character to the UART in step 152. The buffer pointer is decremented in step 154, the processor determines in step 104 that no data is yet present from the computer, and therefore the processor returns to step 120. The processor remains in this loop, sending data out of its buffer until the buffer is empty. At that point, the processor stays in the wait loop comprised of steps 104 and 120 until a new data character is received from the computer. If either one of the characters examined in steps 134 or 138 does not correspond to an OPEN character in the EAROM, the OPEN flag is similarly cleared and the steps just described are performed. Similarly, in a programming sequence, if the second character received is not a Control-R, program control branches from step 162 to step 172 for clearing of the PROGRAM flag. The remaining steps performed after clearing of the program flag are identical to those performed after clearing of the OPEN flag.

Data not coresponding to any access code characters results in "no" answers at steps 110 and 112, and such data is stored in the buffer and retransmitted via the loop comprised of steps 120, 122, 152, 154 and 104.

Returning to FIG. 1, the operation of the circuit for addressable switch 10 will now be described in further detail. I/O ports J1 and J2 each have 25 pins, as previously stated, with pin 3 designated for data and pin 7 for signal ground. All of the remaining pins of J1, i.e., pins 1, 2, 4–6 and 8–25, are wired, respectively, to pins 1, 2, 4–6 and 8–25 of J2. These lines are connected in this manner to maintain continuity of the control lines between the host computer and the other peripherals in the system so as to permit transfer of handshaking signals and the like back and forth through the addressable switch. Although none of these lines is affected by addressable switch 10 in the preferred embodiment, obviously an available one of these lines could be used in an alternative embodiment for transmission of signals from addressable switch 10 to the hose computer, such as, for example, to signal at the main terminal a fault or an open drawer condition.

The microprocessor preferred for U8 is the 8048 microprocessor manufactured by Intel Corp., 3065 Bowers Ave., Santa Clara, Calif. 95051. U7 is a commercially available UART, manufactured by National Semiconductor, Inc., 2900 Semiconductor Drive, Santa Clara, Calif. 95051. The chip select (CS), control/data (C/D), master reset (MR), read (RD) and write (WR) inputs to U7 are control inputs utilized by U8 to check the status and control the operation of UART U7. The levels and timing of the signals required at these inputs to implement the program steps shown in and described with respect to the flow chart in FIG. 2 are such as will be evident to those skilled in the art, especially upon inspection of the data sheets and application notes available for the various devices shown in FIG. 1.

As part of its initialization procedure, microprocessor U8 examines the status of function switch 14 which indicates the format of incoming data by the position of its contacts according to the following table;

| CON-TACT | POSITION | FUNCTION | POSITION | FUNCTION |
| --- | --- | --- | --- | --- |
| 1 | on | odd parity | off | even parity |
| 2 | on | 8 bit word | off | 7 bit word |
| 3 | on | parity enable | off | parity disregard |
| 4 | on | 2 stop bits | off | 1 stop bit |

Crystal 16, which sets the clock frequency for U8, is preferably a 7.3728 MHz crystal. The clock frequency is divided down by U8 to 2.4576 MHz and supplied at the TO output. This frequency is further divided in a baud rate generator comprised of counters U4 and U5 and baud rate switch 22. U4 and U5 are both 74LS393 counters, which are commercially available from National Semiconductor among others. Switch 22 determines the baud rate according to the table below, providing one of seven frequencies to U7, each frequency equal to 16 times the selected baud rate:

| POSITION | BAUD |
| --- | --- |
| 1 | 150 |
| 2 | 300 |
| 3 | 600 |
| 4 | 1200 |
| 5 | 2400 |
| 6 | 4800 |
| 7 | 9600 |

Memory U9 is an EAROM commercially available as device number ER2055 from General Instrument, Inc., 600 West John Street, Hicksville, N.Y. 11802. U8 applies appropriate signals on input lines CS1, C1 and C2 to read the access code stored therein and to reprogram the memory.

When the microprocessor generates an OPEN DRAWER command, it supplies a low level output signal at P2-2 which is coupled along line 24 to transistor 26 and its associated circuitry. This signal turns on transistor 26, which in turn supplies current to solid-state switch 28 to turn that switch on and thereby switch power to solenoid 56 connected to contact 11. Contact 12 is connected to a conventional source of AC voltage, as is conductor 13, the second lead of solenoid 56. Consequently, solenoid 56 becomes energized. Solenoid 56 releases latch member 58 when energized, and spring 54, held in compression between fixed bracket 55 and tray 52, extends and propels tray 52 outward thereby opening drawer 50.

The alarm circuit for addressable switch 10 is shown in FIG. 1C. U8 supplies pulses to one input of dual retriggerable one-shot U6 along line 30 at a rate sufficient to insure that a first one-shot within U6 never times out. Output 32, the output of that one-shot remains low throughout normal operation. However, if the microprocessor fails, the timer times out and output 32 changes to a high state, causing transistor 34 to turn on thereby causing buzzer 36 to sound. A second one-shot within U6 responds to hall-effect device 38, which is mounted in cash drawer 50 adjacent to magnet 39 to detect an open drawer condition. Hall-effect device 38 triggers the second one-shot within U6 when the cash drawer is opened, and U6 responds by generating a high level output signal at output 40 for a short period of time to cause buzzer 36 to sound briefly. U6 is a 74LS123 dual one-shot commercially available from Texas Instruments, Inc., 6000 Denton Drive, Dallas, Tex. 75222. The timing and triggering circuitry associated with that device is well known to those skilled in the art and therefore needs no further explanation.

U3 and its associated circuitry are provided to make addressable switch 10 compatible with the cassette output port of the TRS-80 personal computer line marketed by Radio Shack Division of Tandy Corporation. "TRS-80" and "Radio Shack" are registered trademarks of Tandy Corporation. When U8 is programmed to receive data through its interrupt (INT) input, connected to U3 by line 42, serial input data received at pin 3 of J1 is directly input to the microprocessor through U3. U3 is an LM324 operational amplifier, available from National Semiconductor, configured as a comparator. In applications where the microprocessor is programmed in this manner, other peripherals are not connected to the serial data output line of the host computer. Consequently, when so programmed, addressable switch 10 operates as a "dead-end" device; that is, it does not retransmit data.

The circuit preferably examines the data stream for a 5-character string, with two control characters forming a prefix for an access code packet and the third control character forming a suffix. The two access code characters are stored in the EAROM while the three control characters are stored in EPROM within the microprocessor. However, it will be understood by those versed in the art that the invention is not limited to this format, and that an access code may be set up employing no more than the two access code characters stored in the EAROM, or many more than two access code characters, stored all in EAROM or partly in EAROM and partly in the EPROM. Also, while particular prefix characters have been mentioned in connection with the foregoing description, it is to be understood that any such characters can be used so long as no ambiguities exist with respect to characters representing data being transmitted to other peripheral devices. Further, unique control characters may be assigned as desired by particular customers.

While the invention has been illustrated and described in detail in the drawings and foregoing description, the same is to be considered as illustrative and not restrictive in character, it being understood that only the preferred embodiment has been shown and described and that all changes and modifications that come within the spirit of the invention are desired to be protected.

We claim:

1. An addressable electromechanical-device control switch with serial data input and output ports for series connection between a host computer and a separate peripheral device, comprising:

(a) a serial data input port for receiving a serial data stream from a sending device:

(b) a serial data output port for transmitting serial data out of said control switch to a separate peripheral device serially connected thereto;

(c) a semiconductor memory programmed with an individual access code:

(d) access code detection means for detecting an access code in a received data stream which matches said individual access code stored in said memory, said detection means being coupled to said data input port and data output port, said detection means including (1) gating means for selectively sending data to said data output port, said gating means including means for suppressing an access code matching said stored access code; and (2) means for generating an enable signal in response to detection of an access code matching said stored access code: and (e) means coupled to said detection means for switching an electromechanical load in response to an enable signal.

2. The addressable electromechanical-device control switch of claim 1 in which said detection means further includes means for recognizing a predetermined control data pattern in the data stream received at said data input and for comparing a portion of the data stream adjacent in time to said control data pattern with said individual access code stored in said memory.

3. The addressable electromechanical-device control switch of claim 2 in which said recognizing means recognizes a control data pattern having a predetermined prefix character and a suffix character and in which said comparing means compares characters received between said prefix and suffix characters with said individual access code stored in said memory.

4. The addressable electromechanical-device control switch of claim 3, further comprising:

(f) bus means for transmitting signals bidirectionally through said control switch.

5. The addressable electromechanical-device control switch of claim 4 in which said detection means includes a microprocessor and in which said memory is an electrically alterable read-only memory.

6. The addressable electromechanical-device control switch of claim 5 in which said microprocessor recognizes reprogramming control characters and responds thereto by storing a predetermined adjacent portion of the data stream in said memory.

7. The addressable electromechanical-device control switch of claim 6 further comprising:

(g) a cash drawer, said cash drawer including a housing and a tray slidably mounted within said housing; and (h) alarm means connected to said microprocessor for producing an audible signal for a fixed duration when said cash drawer is opened and for producing a continuous audible signal in response to a malfunction in said microprocessor.

8. An addressable cash drawer for series connection between a host computer and a separate peripheral device, comprising:

(a) a drawer housing;

(b) a tray slidably mounted within said housing;

(c) means for biasing said drawer open;

(d) latch means for holding said drawer closed, said latch means including a solenoid having a movable rod engagable with said tray;

(e) data input/output means for receiving serial data from a sending device and for transmitting serial data to a separate peripheral device;

(f) a semiconductor memory programmed with an individual access code;

(g) access code detection means for detecting an access code in received data which matches said individual access code stored in said memory, said detection means including (1) gating means for selectively sending data to said input/output means, said gating means including means for suppressing an access code matching said stored access code; and (2) means for generating an enable signal in response to detection of an access code matching said stored access code; and (h) means coupled to said detection means for actuating said solenoid in response to an enable signal.

9. The addressable cash drawer of claim 8 in which said detection means includes a microprocessor and in which said memory is an electrically alterable read-only memory, said microprocessor recognizing reprogramming control characters and responding thereto by storing a predetermined adjacent portion of the received serial data in said memory.

10. The addressable cash drawer of claim 9, further comprising:

(i) bus means for transmitting signals bidirectionally through said data input/output means.

* * * * *